(12) United States Patent
Lewinski et al.

(10) Patent No.: US 11,094,953 B2
(45) Date of Patent: *Aug. 17, 2021

(54) ELECTRODE MEMBRANE ASSEMBLY HAVING AN OXYGEN EVOLUTION CATALYST ELECTRODES, AND METHODS OF MAKING AND USING THE SAME

(71) Applicant: 3M INNOVATIVE PROPERTIES COMPANY, St. Paul, MN (US)

(72) Inventors: Krzysztof A. Lewinski, Mahtomedi, MN (US); Sean M. Luopa, Minneapolis, MN (US)

(73) Assignee: 3M Innovative Properties Company, St. Paul, MN (US)

(*) Notice: Subject to any disclaimer, the term of this patent is extended or adjusted under 35 U.S.C. 154(b) by 113 days.

This patent is subject to a terminal disclaimer.

(21) Appl. No.: 15/575,454

(22) PCT Filed: May 4, 2016

(86) PCT No.: PCT/US2016/030727
§ 371 (c)(1),
(2) Date: Nov. 20, 2017

(87) PCT Pub. No.: WO2016/191057
PCT Pub. Date: Dec. 1, 2016

(65) Prior Publication Data
US 2018/0358641 A1    Dec. 13, 2018

Related U.S. Application Data

(60) Provisional application No. 62/166,471, filed on May 26, 2015.

(51) Int. Cl.
*H01M 8/1004* (2016.01)
*C25B 1/04* (2021.01)
(Continued)

(52) U.S. Cl.
CPC ............ *H01M 8/1004* (2013.01); *C25B 1/04* (2013.01); *C25B 9/23* (2021.01); *C25B 9/73* (2021.01);
(Continued)

(58) Field of Classification Search
CPC ........ H01M 4/00; H01M 8/00; H01M 8/1004; H01M 4/9016
See application file for complete search history.

(56) References Cited

U.S. PATENT DOCUMENTS 3,992,271 A    11/1976  Danzig
4,340,276 A     7/1982  Maffitt
(Continued)

FOREIGN PATENT DOCUMENTS

| CA | 2851494 | 4/2013 |
|---|---|---|
| GB | 2508795 | 6/2014 |
| WO | WO 2013/055533 | 4/2013 |
| WO | WO 2014/045049 | 3/2014 |
| WO | WO 2016/100034 | 6/2016 |

OTHER PUBLICATIONS

Carmo, "A comprehensive review on PEM water electrolysis", International Journal of Hydrogen Energy, 2013, vol. 38, pp. 4901-4934.
(Continued)

*Primary Examiner* — James Lee (57) ABSTRACT

Electrode membrane assembly having an oxygen evolution reaction electrodes, the electrode membrane assembly comprising nanostructured whiskers with at least one of metallic Ir or Ir oxide thereon. These oxygen evolution reaction electrodes when paired with suitable hydrogen evolution electrodes are useful, for example, in generating $H_2$ and $O_2$ from water.

19 Claims, 2 Drawing Sheets

(51) Int. Cl.
  C25B 9/23    (2021.01)
  C25B 9/73    (2021.01)
  C25B 11/031  (2021.01)
  H01M 4/88    (2006.01)
  H01M 4/90    (2006.01)
  B82Y 40/00   (2011.01)

(52) U.S. Cl.
  CPC ......... *C25B 11/031* (2021.01); *H01M 4/8807* (2013.01); *H01M 4/9016* (2013.01); *B82Y 40/00* (2013.01); *Y02E 60/36* (2013.01)

(56) References Cited

U.S. PATENT DOCUMENTS

| | | | |
|---|---|---|---|
| 4,568,598 | A | 2/1986 | Bilkadi |
| 4,812,352 | A | 3/1989 | Debe |
| 5,039,561 | A | 8/1991 | Debe |
| 5,338,430 | A | 8/1994 | Parsonage |
| 5,879,827 | A | 3/1999 | Debe |
| 5,879,828 | A | 3/1999 | Debe |
| 6,040,077 | A | 3/2000 | Debe |
| 6,136,412 | A | 10/2000 | Spiewak |
| 6,319,293 | B1 | 11/2001 | Debe |
| 6,624,328 | B1 | 9/2003 | Guerra |
| 7,348,088 | B2 | 3/2008 | Hamrock |
| 7,419,741 | B2 | 9/2008 | Vernstrom |
| 7,901,829 | B2 | 3/2011 | Debe |
| 8,603,400 | B2 | 12/2013 | Hays |
| 10,700,372 | B2 * | 6/2020 | Haugen .................. H01M 4/90 |
| 2002/0004453 | A1 | 1/2002 | Haugen |
| 2002/0100725 | A1 | 8/2002 | Lee |
| 2004/0048466 | A1 | 3/2004 | Gore |
| 2004/0116742 | A1 | 6/2004 | Guerra |
| 2008/0113242 | A1 | 5/2008 | Smith |
| 2010/0047668 | A1 | 2/2010 | Steinbach |
| 2011/0003683 | A1 | 1/2011 | Hays |
| 2013/0101918 | A1 | 4/2013 | Yandrasits |
| 2013/0168237 | A1 | 7/2013 | Sugimasa |
| 2014/0080700 | A1 | 3/2014 | Hays |
| 2014/0246304 | A1 | 9/2014 | Debe |
| 2015/0240369 | A1 | 8/2015 | Jervis |
| 2017/0294669 | A1 * | 10/2017 | Haugen ............... H01M 8/1004 |

OTHER PUBLICATIONS

Chow, "Fabrication of biologically based microstructure composites for vacuum field emission", Materials Science and Engineering, 1992, vol. A158, pp. 1-6.

Debe, "Vacuum vapor deposited thin films of a perylene dicarboximide derivative: microstructure versus deposition parameters", Journal of Vacuum Science & Technology A, May/Jun. 1988, vol. 6, No. 3, pp. 1907-1911.

Debe, "Effect of Gravity on Copper Phthalocyanine Thin Films III: Microstructure Comparisons of Copper Phthalocyanine Thin Films Grown in Microgravity and Unit Gravity", Thin Solid Films, 1990, vol. 186, pp. 327-347.

Debe, "Initial Performance and Durability of Ultra-Low Loaded NSTF Electrodes for PEM Electrolyzers", Journal of the Electrochemical Society, 2012, vol. 159, No. 6, pp. K165-K176.

Grigoriev, "Hydrogen safety aspects related to high-pressure polymer electrolyte membrane water electrolysis", International Journal of Hydrogen Energy, 2009, vol. 34, No. 14, pp. 5986-5991.

Han, "Hydrogen production by water electrolysis using solid polymer electrolyte", Indian Journal of Chemistry, May 2002, vol. 41A, pp. 955-959.

Kam, "Summary Abstract: Dramatic variation of the physical microstructure of a vapor deposited organic thin film", Journal of Vacuum Science & Technology A, Jul./Aug. 1987, vol. 5, No. 4, pp. 1914-1916.

Lee, "Measurement and Modeling of the Reflectance-Reducing Properties of Gradient Index Microstructured Surfaces", Photographic Science and Engineering, Jul./Aug. 1980, vol. 24, No. 4, pp. 211-216.

Millet, "Preparation of New Solid Polymer Electrolyte Composites for Water Electrolysis", International Journal of Hydrogen Energy, 1990, vol. 15, No. 4, pp. 245-253.

Mori, "Development of membrane-electrode composites for polymer electrolyte water electrolysis using new chemical plating method", Proceedings of the World Hydrogen Energy Conference, 1996, vol. 1, pp. 579-587.

Ohnuma, "Amorphous Ultrafine Metallic Particles Prepared by Sputtering Method", Rapidly Quenched Metals, Proceedings of the Fifth International Conference on Rapidly Quenched Metals, Wurzburg, Germany, Sep. 3-7, 1984; Steeb, Editor; pp. 1117-1124 (1985).

Sadaoka, "Effects of morphology on $NO_2$ detection in air at room temperature with phthalocyanine thin films", Journal of Materials Science, 1990, vol. 25, pp. 5257-5268.

Takenaka, "Solid Polymer Electrolyte Water Electrolysis", Advances in Hydrogen Energy, 1981, vol. 1, pp. 107-117.

Tang, "High dispersion and electrocatalytic properties of platinum on well-aligned carbon nanotube arrays", Carbon, 2004, vol. 42, pp. 191-197.

Wei, "The stability of MEA in SPE water electrolysis for hydrogen production", International Journal of Hydrogen Energy, 2010, vol. 35, No. 9, pp. 3951-3957.

International Search Report for PCT International Application No. PCT/US2016/030727, dated Jul. 14, 2016, 4 pages.

* cited by examiner

ELECTRODE MEMBRANE ASSEMBLY HAVING AN OXYGEN EVOLUTION CATALYST ELECTRODES, AND METHODS OF MAKING AND USING THE SAME

CROSS REFERENCE TO RELATED APPLICATIONS

This application is a national stage filing under 35 U.S.C. 371 of PCT/US2016/030727, filed May 4, 2016, which claims the benefit of U.S. Provisional Application No. 62/166,471, filed May 26, 2015, the disclosure of which is incorporated by reference in its/their entirety herein.

BACKGROUND

Water electrolyzers are common electrochemical devices for producing ultra-pure (e.g., typically, at least 99.9% pure) hydrogen from pure water. In the case of Proton Exchange Membrane (PEM) based water electrolyzers, that hydrogen can be obtained at high pressure. These electrolyzers often contain membrane electrode assemblies similar to proton exchange membranes for fuel cells. Proton exchange membrane based water electrolyzers, however, produce hydrogen at the cathode (via a hydrogen evolution reaction) and oxygen at the anode (via an oxygen evolution reaction). The designation of the electrodes as anode or cathode in an electrochemical device here follows the UPAC convention that the anode is the electrode at which the predominant reaction is oxidation (e.g., the $H_2$ oxidation electrode for a fuel cell, or the water oxidation/$O_2$ evolution reaction electrode for a water or $CO_2$ electrolyzer). In a proton exchange membrane fuel cell, the oxygen reduction reaction at the cathode is the sluggish reaction and is responsible for nearly all of the kinetic over potential of the fuel cell, with little effect from the hydrogen oxidation reaction at the anode. Likewise, in an electrolyzer, the oxygen evolution reaction is the sluggish reaction and the hydrogen evolution reaction is the facile reaction. A significant difference between fuel cells and electrolyzers is that whereas fuel cells produce cell voltages below 1.0 volt, electrolyzers need applied cell voltages above about 1.5 volt (anode to cathode) in order to produce useable hydrogen production rates from water electrolysis. This requires high positive potentials (over +1.23 V) on the electrolyzer's oxygen evolution electrode, which leads to corrosion of materials such as carbon or graphite that are used in fuel cell electrodes.

Typical state-of-the-art proton exchange membrane electrolyzers with at least 2.0 mg/cm$^2$ (but more commonly 4.0 mg/cm$^2$ and above) of platinum group metal catalysts (e.g., metallic Ir as high surface area metal fines, PtIr as high surface area metal fines, IrOxides, PtIrOxides, and PtRuOxides) on the anode produce on the order of 2.0 A/cm$^2$ with 1.85 to 2.0 volt applied bias potential. To withstand such relatively high voltages, only solid metallic particles of catalysts (so called blacks or high surface area metal fines) are traditionally used since carbon supported catalysts would quickly corrode away. Customarily, even though the cathode potentials remain close to the reversible hydrogen potential, electrolyzer manufacturers also used blacks on the cathodes to avoid catastrophic failure should any problem occur such as cathode cell reversal that would subject the cathode catalyst to a high potential. These severe operating conditions in the electrolyzer impede new catalyst technology from being introduced into the field since the introduction of the platinum group metal blacks as electrolyzer catalysts decades ago.

Further, the lack of sufficient oxygen evolution reaction activity and stability of the platinum group metal blacks requires relatively high catalyst loadings which keeps capital costs very high. There is a need, for example, for more effective proton exchange membrane electrolyzer catalysts that can operate at the same potentials (efficiencies) as conventional platinum group metal blacks but at much reduced platinum group metal loadings.

SUMMARY

In one aspect, the present disclosure describes an electrode membrane assembly having an oxygen evolution reaction electrode, the electrode membrane assembly comprising, in order:

an ion conducting membrane having first and second generally opposed major surfaces;

nanostructured whiskers having an oxygen evolution reaction electrocatalyst thereon, the electrocatalyst comprising at least one layer, wherein any layer of the oxygen evolution reaction electrocatalyst comprises collectively at least 95 (in some embodiments, at least 96, 97, 98, 99, 99.5, or even at least 99.9) atomic percent Ir (which may be present as metallic Ir, Ir oxide (i.e., at least one Ir oxide), or a combination thereof), and not greater than 5 (in some embodiments, not greater than 4, 3, 2, 1, 0.5, 0.1, 0.005, or even not greater than 0.001) atomic percent Pt, based on the total collective cation and elemental metal content of the respective layer; and a first fluid transport layer comprising an electrically conductive, corrosion resistant, porous metal, wherein the nanostructured whiskers are adjacent to the first major surface of the ion conducting membrane and the first fluid transport layer serves as a metal electrode in electrical contact with the nanostructured whiskers, and wherein the ion conducting membrane, the nanostructured whiskers having the oxygen evolution reaction electrocatalyst thereon, and the first fluid transport layer collectively have an electrical conductance of at least 0.1 S·cm$^{-2}$ (i.e., 0.1 Siemens per square centimeter) (in some embodiments, at least 0.5 S·cm$^{-2}$, 1.0 S·cm$^{-2}$, 5 S·cm$^{-2}$, 10 S·cm$^{-2}$, 15 S·cm$^{-2}$, 20 S·cm$^{-2}$, or even at least 25 S·cm$^{-2}$).

Electrode membrane assemblies having an oxygen evolution reaction electrode described herein are useful, for example, in electrochemical devices (e.g., water electrolyzers or carbon dioxide electrolyzers).

Surprisingly, significantly reducing the amount of platinum in an iridium-based oxygen evolution reaction electrocatalyst was observed to provide an electrolyzer anode construction capable of operating at higher current densities for a given cell voltage than comparable devices, operating at current densities up to at least 19 A/cm$^2$ (almost a factor of 10 greater than comparable devices) and operating reliably for at least 5000 hours.

DETAILED DESCRIPTION

Nanostructured whiskers can be provided by techniques known in the art, including those described in U.S. Pat. No.

4,812,352 (Debe), U.S. Pat. No. 5,039,561 (Debe), U.S. Pat. No. 5,338,430 (Parsonage et al.), U.S. Pat. No. 6,136,412 (Spiewak et al.), and U.S. Pat. No. 7,419,741 (Vernstrom et al.), the disclosures of which are incorporated herein by reference. In general, nanostructured whiskers can be provided, for example, by vacuum depositing (e.g., by sublimation) a layer of organic or inorganic material such as perylene red onto a substrate (e.g., a microstructured catalyst transfer polymer), and then converting the perylene red pigment in to nanostructured whiskers by thermal annealing. Typically the vacuum deposition steps are carried out at total pressures at or below about $10^{-3}$ Torr or 0.1 Pascal. Exemplary microstructures are made by thermal sublimation and vacuum annealing of the organic pigment C.I. Pigment Red 149 (i.e., N,N'-di(3,5-xylyl)perylene-3,4:9,10-bis(dicarboximide)). Methods for making organic nanostructured layers are disclosed, for example, in Materials Science and Engineering, A158 (1992), pp. 1-6; J. Vac. Sci. Technol. A, 5 (4), July/August, 1987, pp. 1914-16; J. Vac. Sci. Technol. A, 6, (3), May/August, 1988, pp. 1907-11; Thin Solid Films, 186, 1990, pp. 327-47; J. Mat. Sci., 25, 1990, pp. 5257-68; Rapidly Quenched Metals, Proc. of the Fifth Int. Conf. on Rapidly Quenched Metals, Wurzburg, Germany (Sep. 3-7, 1984), S. Steeb et al., eds., Elsevier Science Publishers B.V., New York, (1985), pp. 1117-24; Photo. Sci. and Eng., 24, (4), July/August, 1980, pp. 211-16; and U.S. Pat. No. 4,340,276 (Maffitt et al.) and U.S. Pat. No. 4,568,598 (Bilkadi et al.), the disclosures of which are incorporated herein by reference. Properties of catalyst layers using carbon nanotube arrays are disclosed in the article "High Dispersion and Electrocatalytic Properties of Platinum on Well-Aligned Carbon Nanotube Arrays," Carbon 42 (2004) 191-197. Properties of catalyst layers using grassy or bristled silicon are disclosed in U.S. Pat. App. Pub. 2004/0048466 A1 (Gore et al.).

Vacuum deposition may be carried out in any suitable apparatus (see, e.g., U.S. Pat. No. 5,338,430 (Parsonage et al.), U.S. Pat. No. 5,879,827 (Debe et al.), U.S. Pat. No. 5,879,828 (Debe et al.), U.S. Pat. No. 6,040,077 (Debe et al.), and U.S. Pat. No. 6,319,293 (Debe et al.), and U.S. Pat. App. Pub. No. 2002/0004453 A1 (Haugen et al.), the disclosures of which are incorporated herein by reference). One exemplary apparatus is depicted schematically in FIG. 4A of U.S. Pat. No. 5,338,430 (Parsonage et al.), and discussed in the accompanying text, wherein the substrate is mounted on a drum that is then rotated over a sublimation or evaporation source for depositing the organic precursor (e.g., perylene red pigment) in order to form the nanostructured whiskers.

Typically, the nominal thickness of deposited perylene red pigment is in a range from about 50 nm to 500 nm. Typically, the whiskers have an average cross-sectional dimension in a range from 20 nm to 60 nm and an average length in a range from 0.3 micrometer to 3 micrometers.

In some embodiments, the whiskers are attached to a backing. Exemplary backings comprise polyimide, nylon, metal foils, or other material that can withstand the thermal annealing temperature up to 300° C. In some embodiments, the backing has an average thickness in a range from 25 micrometers to 125 micrometers.

In some embodiments, the backing has a microstructure on at least one of its surfaces. In some embodiments, the microstructure is comprised of substantially uniformly shaped and sized features at least three (in some embodiments, at least four, five, ten or more) times the average size of the nanostructured whiskers. The shapes of the microstructures can, for example, be V-shaped grooves and peaks (see, e.g., U.S. Pat. No. 6,136,412 (Spiewak et al.), the disclosure of which is incorporated herein by reference) or pyramids (see, e.g., U.S. Pat. No. 7,901,829 (Debe et al.), the disclosure of which is incorporated herein by reference). In some embodiments, some fraction of the features of the microstructures extend above the average or majority of the microstructured peaks in a periodic fashion, such as every $31^{st}$ V-groove peak is 25% or 50% or even 100% taller than those on either side of it. In some embodiments, this fraction of features that extend above the majority of the microstructured peaks can be up to 10% (in some embodiments up to 3%, 2%, or even up to 1%). Use of the occasional taller microstructure features may facilitate protecting the uniformly smaller microstructure peaks when the coated substrate moves over the surfaces of rollers in a roll-to-roll coating operation. The occasional taller feature touches the surface of the roller rather than the peaks of the smaller microstructures and so much less of the nanostructured material or whiskers is likely to be scraped or otherwise disturbed as the substrate moves through the coating process. In some embodiments, the nanostructured whiskers are at least partially embedded in the ion conducting membrane. In some embodiments, the microstructure features are substantially smaller than half the thickness of the membrane that the catalyst will be transferred to in making a membrane electrode assembly (MEA). This is so that during the catalyst transfer process, the taller microstructure features do not penetrate through the membrane where they may overlap the electrode on the opposite side of the membrane. In some embodiments, the tallest microstructure features are less than $\frac{1}{3}^{rd}$ or $\frac{1}{4}^{th}$ of the membrane thickness. For the thinnest ion exchange membranes (e.g., about 10 to 15 micrometers in thickness), it may be desirable to have a substrate with microstructured features no larger than about 3 to 4.5 micrometers tall. The steepness of the sides of the V-shaped or other microstructured features or the included angles between adjacent features in some embodiments may be desirable to be on the order of 90° for ease in catalyst transfer during a lamination-transfer process and in order to have a gain in surface area of the electrode that comes from the square root of two (1.414) surface area of the microstructured layer relative to the planar geometric surface of the substrate backing.

In general, a variety of metals or materials can be sputtered onto the nanostructured whiskers as described in detail in U.S. Pat. No. 5,879,827 (Debe et al.), U.S. Pat. No. 6,040,077 (Debe et al.), and U.S. Pat. No. 7,419,741 (Vernstrom et al.), and U.S. Pat. Pub. No. 2014/0246304 A1 (Debe et al.), the disclosures of which are incorporated herein by reference. In some embodiments, sputtering is conducted at least in part in an atmosphere comprising argon that is flowing into the sputtering chamber at a rate of at least 120 sccm (i.e., standard cubic centimeters cubed per minute).

The electrocatalyst comprises at least one layer, wherein any layer of the oxygen evolution reaction electrocatalyst comprises collectively at least 95 (in some embodiments, at least 96, 97, 98, 99, 99.5, or even at least 99.9) atomic percent Ir (which may be present as one of metallic Ir, Ir oxide (i.e., at least one Ir oxide), or a combination thereof), based on the total collective cation and elemental metal content of the respective layer. Further, the electrocatalyst preferably contains no Pt, but in some embodiments may comprise not greater than 5 (in some embodiments, not greater than 4, 3, 2, 1, 0.5, 0.1, 0.005, or even not greater than 0.001) atomic percent Pt, based on the total collective cation and elemental metal content of the respective layer.

Typically, the planar equivalent thickness of an electrocatalyst layer is in a range from 0.5 nm to 5 nm. "Planar equivalent thickness" means, in regard to a layer distributed on a surface, which may be distributed unevenly, and may have an uneven surface (such as a layer of snow distributed across a landscape, or a layer of atoms distributed in a process of vacuum deposition), a thickness calculated on the assumption that the total mass of the layer was spread evenly over a plane covering the same projected area as the surface (noting that the projected area covered by the surface is less than or equal to the total surface area of the surface, once uneven features and convolutions are ignored).

In some embodiments, the electrocatalyst comprises up to 1.0 mg/cm$^2$ (in some embodiments, up to 0.25 mg/cm$^2$, or even up to 0.025 mg/cm$^2$) of Ir, be it in the form of metallic Ir and/or Ir oxide. Typically, the electrocatalyst is a continuous layer on each whisker, and may form a bridge to adjacent whiskers.

In some embodiments, catalyst is coated in-line, in a vacuum immediately following the nanostructured whisker growth step on the microstructured substrate. This may be a more cost effective process so that the nanostructured whisker coated substrate does not need to be re-inserted into the vacuum for catalyst coating at another time or place. If the Ir catalyst coating is done with a single target, it may be desirable that the coating layer be applied in a single step onto the nanostructured whiskers so that the heat of condensation of the catalyst coating heats the Ir, O, etc. atoms and substrate surface sufficiently to provide enough surface mobility that the atoms are well mixed and form thermodynamically stable domains. Alternatively the substrate can also be provided hot or heated to facilitate this atomic mobility, such as by having the nanostructured whisker coated substrate exit the perylene red annealing oven immediately prior to the catalyst sputter deposition step.

It will be understood by one skilled in the art that the crystalline and morphological structure of a catalyst described herein, including the presence, absence, or size of alloys, amorphous zones, crystalline zones of one or a variety of structural types, and the like, may be highly dependent upon process and manufacturing conditions, particularly when three or more elements are combined.

Further, catalysts described herein are useful for providing membrane electrode assemblies. "Membrane electrode assembly" refers to a structure comprising a membrane that includes an electrolyte, typically a solid polymer electrolyte, and at least one but more typically two or more electrodes adjoining the membrane.

Catalysts described herein can be used to manufacture electrolyzer catalyst coated membranes (CCMs) or membrane electrode assemblies (MEAs) similar to those incorporated in fuel cells such as those described in U.S. Pat. No. 5,879,827 (Debe et al.), and U.S. Pat. No. 5,879,828 (Debe et al.), and U.S. Pat. Pub. No. 2014/0246304 A1 (Debe et al.), the disclosures of which are incorporated herein by reference, including providing additional catalyst electrodes (e.g., cathode). The additional catalyst electrodes can comprise material known in the art for such use, including Pt, Ir, Ir oxide, and combinations thereof.

Electrocatalysts described herein are useful, for example, in generating $H_2$ and $O_2$ from water. For example, generating hydrogen and oxygen from water by a method comprising:

providing an oxygen evolution reaction membrane electrode assembly comprising an anode and a cathode, the anode being an oxygen evolution reaction electrode described herein, and having the cathode adjacent the second major surface of the ion conducting membrane;

providing water in contact with the anode; and providing an electrical potential difference with sufficient ion current across the membrane electrode assembly to convert at least a portion of the water to hydrogen and oxygen.

Figure 1:
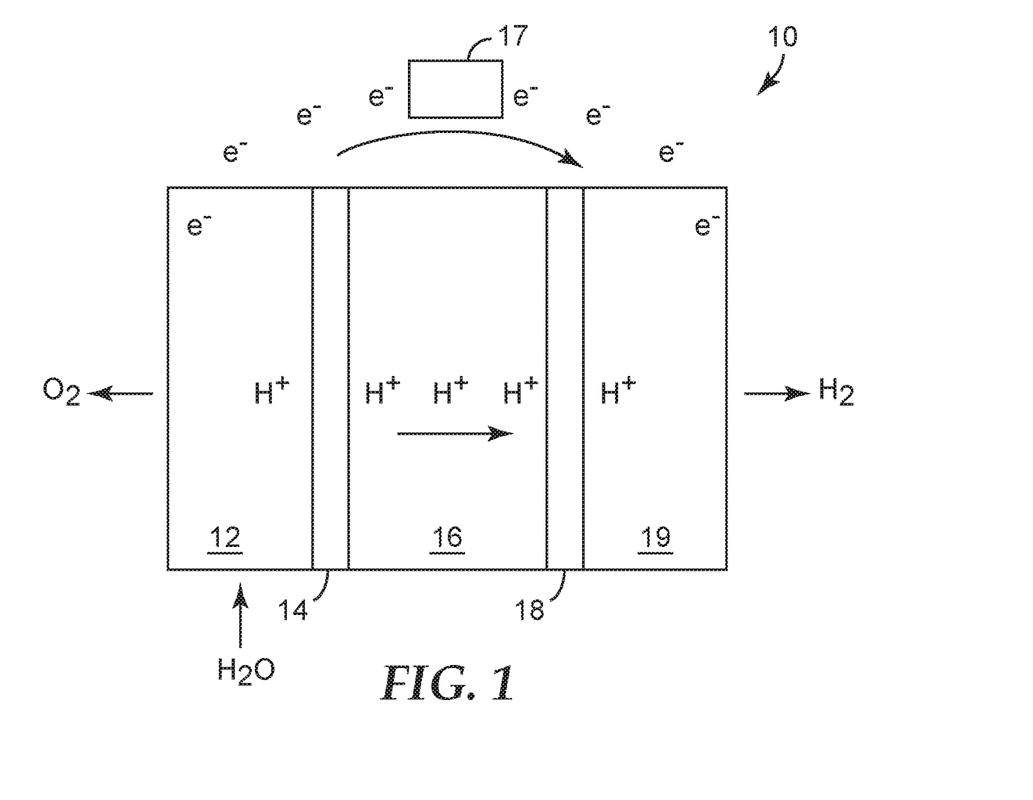
FIG. 1 is a schematic of an exemplary water electrolyzer.

An exemplary electrolyzer cell is depicted in FIG. 1. Cell 10 shown in FIG. 1 includes first fluid transport layer (FTL) 12 adjacent anode 14. Adjacent anode 14 is electrolyte membrane 16. Cathode 18 is situated adjacent electrolyte membrane 16, and second fluid transport layer 19 is situated adjacent cathode 18. FTLs 12 and 19 can be referred to as diffuser/current collectors (DCCs) or gas diffusion layers (GDLs). In operation, water is introduced into anode portion of cell 10, passing through first fluid transport layer 12 and over anode 14. Power source 17 applies an electrical current source on cell 10.

In a proton exchange membrane (PEM) water electrolyzer, electrolyte membrane 16 permits only the hydrogen ions or protons to pass through electrolyte membrane 16 to the cathode portion of cell 10. The electrons cannot pass through electrolyte membrane 16 and, instead, flow through an external electrical circuit in the form of electric current.

The hydrogen ions ($H^+$) combine with the electrons at cathode 18, and hydrogen gas is collected through second fluid transport layer 19 situated adjacent cathode 18. Oxygen gas is collected at the anode of cell 10 via first fluid transport layer 12 situated adjacent the anode 14.

Gas diffusion layers (GDLs) facilitate gas transport to and from the anode and cathode electrode materials and conduct electrical current. The GDL is both porous and electrically conductive, and on the cathode side is typically composed of carbon fibers. However, in order avoid degradation of carbon at the high potentials of the anode, it is preferred to use a more corrosion resistant material, such as porous titanium, as the GDL on the anode. The GDL may also be called a fluid transport layer (FTL) or a diffuser/current collector (DCC). In some embodiments, the anode and cathode electrode layers are applied to GDLs and the resulting catalyst-coated GDLs or CCBs (catalyst coating backing) are sandwiched with a polymer electrolyte such as a PEM to form a five-layer MEA. The five layers of such a five-layer MEA are, in order: anode GDL, anode electrode layer, ion conducting membrane, cathode electrode layer, and cathode GDL. The anode electrode layer and cathode electrode layer typically comprise an anode catalyst and a cathode catalyst, respectively. In other embodiments, the anode and cathode electrode layers are applied to either side of the ion conducting membrane, and the resulting catalyst-coated membrane (CCM) is sandwiched between two GDLs (or FTLs) to form a five-layer MEA.

An ion conducting membrane used in a CCM or MEA described herein may comprise any suitable polymer electrolyte. Exemplary useful polymer electrolytes typically bear anionic functional groups bound to a common backbone, which are typically sulfonic acid groups but may also include carboxylic acid groups, imide groups, amide groups, or other acidic functional groups. Anion conducting membranes comprising cationic functional groups bound to a common backbone are also possible, but are less commonly used. Exemplary useful polymer electrolytes are typically highly fluorinated and most typically perfluorinated. Exemplary useful electrolytes include copolymers of tetrafluoroethylene and at least one fluorinated, acid-functional co-monomer. Typical polymer electrolytes include those available from DuPont Chemicals, Wilmington, Del., under the trade designation "NAFION" and from Asahi Glass Co. Ltd., Tokyo, Japan, under the trade designation "FLE- MION." The polymer electrolyte may be a copolymer of tetrafluoroethylene (TFE) and $FSO_2$—$CF_2CF_2CF_2CF_2$—$O$—$CF$=$CF_2$, described in U.S. Pat. No. 6,624,328 (Guerra), and U.S. Pat. No. 7,348,088 (Hamrock et al.), and U.S. Pub. No. 2004/0116742 (Guerra), the disclosures of which are incorporated herein by reference. The polymer typically has an equivalent weight (EW) up to 1200 (in some embodiments, up to 1100, 1000, 900, 825, 800, 725, or even up to 625).

The polymer can be formed into a membrane by any suitable method. The polymer is typically cast from a suspension. Any suitable casting method may be used, including bar coating, spray coating, slit coating, and brush coating. Alternately, the membrane may be formed from neat polymer in a melt process such as extrusion. After forming, the membrane may be annealed, typically at a temperature of at least 120° C. (in some embodiments, at least 130° C., 150° C., or higher). The membrane typically has a thickness up to 50 micrometers (in some embodiments, up to 40 micrometers, 30 micrometers, or even up to 25 micrometers).

The polymer membrane can also include a support matrix consisting of a porous network of interlinked fibers that will provide the ion exchange polymer (ionomer) with additional mechanical strength to withstand the sometimes large pressure differentials across the membrane due to the high pressure of the cathode side during hydrogen evolution. The support matrix can be made of an expanded polytetrafluoroethylene (e.g., that available under the trade designation "TEFLON" from DuPont Chemicals, Wilmington, Del.), or a partially fluorinated fibrous matrix that will be stable in the acidic environment of the ionomer.

In some embodiments, the membrane has a first proton conducting polymer reinforced with a nanofiber mat; wherein the nanofiber mat is made from a nanofiber comprising a fiber material selected from polymers and polymer blends; wherein the fiber material has a fiber material proton conductivity; wherein the first proton conducting polymer has a first proton conducting polymer conductivity; and wherein the fiber material proton conductivity is less than the first proton conducting polymer conductivity.

In some embodiments, the fiber material in the membrane may include highly fluorinated polymer, perfluorinated polymer, hydrocarbon polymer, blends and combinations thereof. In some embodiments, the fiber material in the membrane may include a polymer suitable for electrospinning selected from the group consisting of PVDF, PES, PEI, PBI, PPO, PEEK, PPES, PEK, blends, and combinations thereof. In some embodiments, the fiber material in the membrane may be an electrospun nanofiber. In some embodiments, the fiber material in the electrolyte membrane may include a stabilizing additive, which may include an element selected from Mn or Ce.

Additional details for exemplary membranes can be found, for example, in U.S. Pat. Pub. Nos. 2008/0113242, 2002/0100725, and 2011/036935, the disclosures of which are incorporated herein by reference.

Optionally, the membranes are washed in acid (e.g., 1.0 molar nitric acid to remove any metal cation impurities, or nitric acid plus hydrogen peroxide to remove organic impurities, followed by rinsing in deionized water) prior to deposition of the nanostructured whiskers to remove cation impurities. Heating the washing bath (e.g., to 30° C., 40° C., 50° C., 60° C., 70° C., or even 80° C.) may make the cleaning faster. Benefits of acid washing the membrane may depend on the particular membrane.

In making an MEA, GDLs may be applied to either side of a CCM. The GDLs may be applied by any suitable means. Suitable GDLs include those stable at the electrode potentials of use. For example, the cathode GDL can contain free carbon black or carbon fibers since it is operated at low potentials sufficient for adequate hydrogen evolution, whereas the anode GDL is typically made of Ti or some other stable material at the high potentials characteristic of oxygen evolution. Typically, the cathode GDL is a carbon fiber construction of woven or non-woven carbon fibers. Exemplary carbon fiber constructions include those available, for example, under the trade designation "TORAY" (carbon paper) from Toray, Japan; "SPECTRACARB" (carbon paper) from Spectracarb, Lawrence, Mass.; and "ZOLTEK" (carbon cloth) from Zoltek, St. Louis, Mo., as well as from Mitsubishi Rayon Co., Japan, and Freudenberg, Germany. The GDL may be coated or impregnated with various materials, including carbon particle coatings, hydrophilizing treatments, and hydrophobizing treatments such as coating with polytetrafluoroethylene (PTFE).

Typically, the electrolyzer anode GDL is metal foam or porous metal screen or mesh comprised, for example, of Pt, Au, Ti, Ta, Nb, Zr, Hf, or a metal alloy that will not corrode (e.g., Ti-10V-5Zr) and yet will have adequate electrical conductivity (e.g., by sputter deposition or electroplating a layer of Pt or Au onto the surface in the case of a Ti GDL) for the electrolyzer operation at the potentials of use above the thermodynamic potential for water oxidation at 1.23 V.

In use, MEAs described herein are typically sandwiched between two rigid plates, known as distribution plates, also known as end plates (or in case of multicell stack, bipolar plates (BPPs)). Like the GDL, the distribution plate must be electrically conductive and be stable at the potentials of the electrode GDL against which it is placed. The distribution plate is typically made of materials such as carbon composite, metal, coated or plated metals. As for the GDLs, the cathode plate of the electrolyzer can be any material common to use in fuel cells, whereas the anode plate of the electrolyzer must be fabricated of a material that will not corrode above potentials of 1.23 volt, or up to 1.5 volt, 2.5 volt, or higher relative to the potential of a reversible hydrogen electrode (RHE). An exemplary coating for the anode plate comprises Ti-10V-5Zr. The distribution plate distributes reactant or product fluids to and from the MEA electrode surfaces, typically through at least one fluid-conducting channel engraved, milled, molded, or stamped in the surface(s) facing the MEA(s). These channels are sometimes designated a flow field. The distribution plate may distribute fluids to and from two consecutive MEAs in a stack, with one face directing water to and oxygen from the anode of the first MEA while the other face directs evolved hydrogen and water (that crosses over the membrane) away from the cathode of the next MEA, hence the term "bipolar plate." Alternately, the distribution plate may have channels on one side only, to distribute fluids to or from an MEA on only that side, in which case, the distribution plate may be termed an "end plate." The term bipolar plate, as used in the art, typically encompasses end plates as well.

EXEMPLARY EMBODIMENTS

1. An electrode membrane assembly having an oxygen evolution reaction electrode, the electrode membrane assembly comprising, in order:

an ion conducting membrane having first and second generally opposed major surfaces;

nanostructured whiskers having an oxygen evolution reaction electrocatalyst thereon, the electrocatalyst comprising at least one layer, wherein any layer of the oxygen evolution reaction electrocatalyst comprises collectively at least 95 (in some embodiments, at least 96, 97, 98, 99, 99.5, or even at least 99.9) atomic percent Ir (which may be present as one of metallic Ir, Ir oxide (i.e., at least one Ir oxide), or a combination thereof), and not greater than 5 (in some embodiments, not greater than 4, 3, 2, 1, 0.5, 0.1, 0.005, or even not greater than 0.001) atomic percent Pt, based on the total collective cation and elemental metal content of the respective layer; and a first fluid transport layer comprising an electrically conductive, corrosion resistant, porous metal,
wherein the nanostructured whiskers are adjacent to the first major surface of the ion conducting membrane and the first fluid transfer layer is also a portion of a metal electrode in electrical contact with the nanostructured whiskers, and wherein the ion conducting membrane, the nanostructured whiskers having the oxygen evolution reaction electrocatalyst thereon, and the first fluid transport layer collectively have an electrical conductance of at least 0.1 $S \cdot cm^{-2}$ (in some embodiments, at least 0.5 $S \cdot cm^{-2}$, 1.0 $S \cdot cm^{-2}$, 5 $S \cdot cm^{-2}$, 10 $S \cdot cm^{-2}$, 15 $S \cdot cm^{-2}$, 20 $S \cdot cm^{-2}$, or even at least 25 $S \cdot cm^{-2}$).

2. The electrode membrane assembly of any preceding Exemplary Embodiment, wherein the first fluid transport layer comprises Ti.

3. The electrode membrane assembly of any preceding Exemplary Embodiment, wherein the ion conducting membrane comprises a proton exchange membrane.

4. The electrode membrane assembly of any preceding Exemplary Embodiment, wherein the nanostructured whiskers comprise organic pigment perylene red.

5. The electrode membrane assembly of any preceding Exemplary Embodiment, wherein the nanostructured whiskers are at least partially embedded in the ion conducting membrane.

6. The electrode membrane assembly of any preceding Exemplary Embodiment, wherein the electrocatalyst is a continuous layer on the nanostructured whiskers.

7. An electrochemical device comprising the electrode membrane assembly of any preceding Exemplary Embodiment.

8. The electrochemical device of Exemplary Embodiment 7, further comprising a hydrogen evolution reaction catalyst adjacent the second major surface of the ion conducting membrane and an electrically conducting second fluid transport layer in electrical contact with the hydrogen evolution reaction catalyst.

9. The electrochemical device of Exemplary Embodiment 8, wherein the hydrogen evolution reaction catalyst comprises nanostructured whiskers having a major surface with a hydrogen evolution reaction electrocatalyst comprising Pt thereon.

10. The electrochemical device of any of Exemplary Embodiments 7, 8, or 9, wherein the device is a water electrolyzer.

11. A method of generating hydrogen and oxygen from water, the method comprising:

providing an electrode membrane assembly of any of Exemplary Embodiments 1 to 6, the electrode membrane assembly comprising an anode and cathode, the anode being an oxygen evolution reaction electrode, and the cathode catalyst being adjacent to the second major surface of the ion conducting membrane;

providing water in contact with the anode; and
providing an electrical potential with sufficient current across the membrane electrode assembly to convert at least a portion of the water to hydrogen and oxygen on the cathode and anode, respectively.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

General Method for Preparing Nanostructured Whiskers

Nanostructured whiskers were prepared by thermal annealing a layer of perylene red pigment (C.I. Pigment Red 149, also known as "PR149", obtained from Clariant, Charlotte, N.C.), which was sublimation vacuum coated onto microstructured catalyst transfer polymer substrates (MCTS) with a nominal thickness of 200 nm, as described in detail in U.S. Pat. No. 4,812,352 (Debe), the disclosure of which is incorporated herein by reference.

A roll-good web of the MCTS (made on a polyimide film obtained from E.I. du Pont de Nemours, Wilmington, Del., under trade designation "KAPTON") was used as the substrate on which the PR149 was deposited. The MCTS substrate surface had V-shaped features with about 3 micrometer tall peaks, spaced 6 micrometers apart. A nominally 100 nm thick layer of Cr was then sputter deposited onto the MCTS surface using a DC magnetron planar sputtering target and typical background pressures of Ar and target powers known to those skilled in the art sufficient to deposit the Cr in a single pass of the MCTS web under the target at the desired web speed. The Cr coated MCTS web then continued over a sublimation source containing the PR149 pigment material. The PR149 was heated to a controlled temperature near 500° C. so as to generate sufficient vapor pressure flux to deposit 0.022 $mg/cm^2$, or approximately 220 nm thick layer of the PR149 in a single pass of the web over the sublimation source. The mass or thickness deposition rate of the sublimation can be measured in any suitable fashion known to those skilled in the art, including optical methods sensitive to film thickness, or quartz crystal oscillator devices sensitive to mass. The PR149 coating was then converted to the whisker phase by thermal annealing, as described in detail in U.S. Pat. No. 5,039,561 (Debe), the disclosure of which is incorporated herein by reference, by passing the PR149 coated web through a vacuum having a temperature distribution sufficient to convert the PR149 as-deposited layer into a layer of oriented crystalline whiskers at the desired web speed, such that the whisker layer has an average whisker areal number density of 68 whiskers per square micrometer, determined from SEM images, with an average length of 0.6 micrometer.

General Method for Preparing Nanostructured Thin Film (NSTF) Catalyst

Nanostructured thin film (NSTF) catalyst Ir-based oxygen evolution reaction catalyst was prepared by sputter coating Ir catalyst films onto the layer of nanostructured whiskers (which were prepared as described above).

Figure 2:
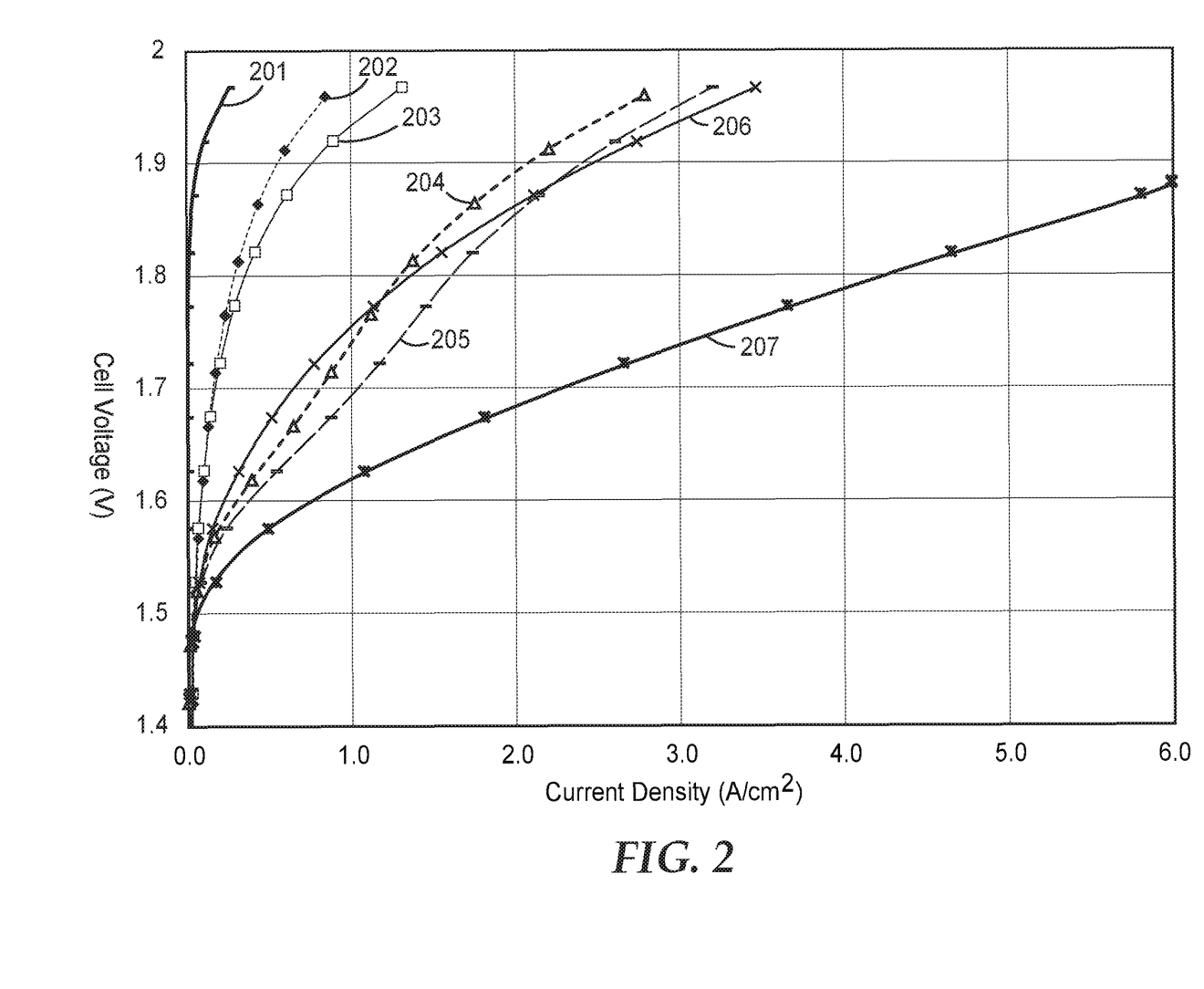
FIG. 2 is a plot of the required water electrolyzer cell voltage vs. current density for cells using NSTF-based oxygen evolution reaction electrocatalysts containing various ratios of iridium to platinum.

More specifically, Ir was magnetron sputter deposited onto the nanostructured PR149 whisker coated substrates prepared as above, using typical Ar sputter gas pressures of about 5 mTorr (0.66 Pa), and 2 inch×10 inch (5 centimeter×25.4 centimeter) rectangular sputter targets (obtained from Sophisticated Alloys, Inc., Butler, Pa.). For Example 2, Ar at a flow rate of 120 sccm was used to provide non-oxidizing environment for the alloy deposition. The vacuum chamber used is depicted to schematically in FIG. 4A of U.S. Pat. No. 5,879,827 (Debe et al.), the disclosure of which is incorporated herein by reference, wherein the PR149 coated MCTS substrates are mounted on a drum that is then rotated so as to pass the substrate over sequential DC magnetron sputtering targets, each having a different elemental composition. For each rotation of the drum and hence each pass of the substrate over the planar targets, a combined bi-layer of desired thickness was deposited on the whiskers for two targets. A single target was used for Pt—NSTF and Ir-NSTF depositions and two targets were used for bi-layer compositions of $Ir_xPt_y$-NSTF used as comparative examples (in FIG. 2). The DC magnetron sputtering target deposition rates were measured by standard methods known to those skilled in the art. Each magnetron sputtering target power was then controlled to give the desired deposition rate of that element at the operating drum speed sufficient to give the desired mono- or bi-layer thicknesses of catalysts on the whisker coated substrates for each rotation of the drum. Mono- and bi-thicknesses refer to the planar equivalent thickness of the deposited material, as-measured if the same deposition rate and time were used to deposit the films on a perfectly flat surface assuming that the coating was spread over the surface evenly. In catalysts of the present invention, a single Ir target was used, while in some Comparative Examples both an Ir target and a Pt target were used.

Typical mono- and bi-layer thicknesses (total planar equivalent thickness of a first layer and the next occurring second layer) were about 16 Angstroms. For example, for an $Ir_xPt_y$ alloy film deposited on the whiskers, a $Pt_{50}Ir_{50}$ atomic composition alloy would have sub-layers of Pt and Ir of approximately 8 Angstroms each to make a 16 Angstrom bi-layer. To obtain a total target loading of alloy on the substrate whiskers, the number of drum rotations was controlled. For example, to obtain an $Ir_{50}Pt_{50}$ film coating containing 0.25 mg/cm$^2$ of Ir, with 16 Angstrom bi-layers, approximately 138 rotations of the drum would be required assuming an Ir film density of 22.56 mg/cm$^3$.

General Method for Preparing Catalyst-Coated Membrane (CCM)

Catalyst-coated-membranes (CCMs) were made by transferring the catalyst coated whiskers described above onto both surfaces (full CCM) of a proton exchange membrane (PEM) using the processes as described in detail in U.S. Pat. No. 5,879,827 (Debe et al.). The catalyst transfer was accomplished by hot roll lamination onto perfluorinated sulfonic acid membrane obtained from 3M Company, St. Paul, Minn., with a nominal equivalent weight of 825 and thickness of 50 μm (used as made). CCMs were made with 825 equivalent weight PEM (obtained from 3M Company), the hot roll temperatures were 350° F. (177° C.) and the gas line pressure fed to force laminator rolls together at the nip ranged from 150 psi to 180 psi (1.03 MPa to 1.24 MPa). The catalyst coated MCTS was precut into 13.5 cm×13.5 cm square shapes and sandwiched onto one or both side(s) of a larger square of PEM. The PEM with catalyst coated MCTS on one or both side(s), was placed between 2 mil (50 micrometer) thick polyimide film and then coated paper on the outside prior to passing the stacked assembly through the nip of the hot roll laminator at a speed of 1.2 ft./min. (37 cm/min.). Immediately after passing through the nip, while the assembly was still warm, the layers of polyimide and paper were quickly removed and the Cr-coated MCTS substrates were peeled off the CCM by hand, leaving the catalyst coated whiskers stuck to the PEM surface(s).

General Method for Testing Full CCM

Full CCMs fabricated as described above were then tested in an $H_2/O_2$ electrolyzer single cell. The full CCMs were installed with appropriate gas diffusion layers directly into a 50 cm$^2$ test cell (obtained under the trade designation "50SCH" from Fuel Cell Technologies, Albuquerque, N. Mex.), with quad serpentine flow fields. The normal graphite flow field block on the anode side was replaced with a Pt-plated Ti flow field block of the same dimensions and flow field design (obtained from Giner, Inc., Auburndale, Mass.) in order to withstand the high anode potentials during electrolyzer operation. Purified water with a resistivity of 18 MΩ was supplied to the anode at 75 mL/min. An 800 A/10 kW power supply (obtained under the trade designation "ESS", model ESS 12.5-800-7-D-LB-RSTL from TDK-Lambda, Neptune, N.J.), was connected to the cell and used to control the applied cell voltage or current density.

Comparative Example A

Nanostructured whiskers prepared as described above were sputter coated with pure Pt coatings in pure Ar according to the general method for preparing nanostructured thin film (Pt-NSTF) catalyst layers. The pure Pt was deposited with a loading of 0.25 mg/cm$^2$. Full CCMs were prepared with the resulting Pt-NSTF catalysts layers using 50 micrometer thick, 825 equivalent weight PEM (3M Company) by the hot-roll lamination process described above. The same catalyst was used for both the anode and the cathode. The full CCM was mounted into the 50 cm$^2$ electrolyzer cell and tested according to general method for testing full CCMs, producing polarization curve 201 shown in FIG. 2.

Comparative Example B

Comparative Example B Cathode catalyst (Pt-NSTF) was prepared in the same manner as Comparative Example A. Nanostructured whiskers prepared as described above were sputter coated with pure Pt coatings in pure Ar according to the general method for preparing nanostructured thin film (Pt—NSTF) catalyst layers. The pure Pt was deposited with a loading of 0.25 mg/cm$^2$. Comparative Example B Anode catalyst ($Ir_xPt_y$-NSTF) was prepared as follows: PtIr alloy coating was sputter deposited in pure Ar onto nanostructured whiskers. The IrPt-NSTF alloy was $Ir_{50}Pt_{50}$ and was deposited to a total loading of 0.50 mg/cm$^2$. The catalyst coating contained a total Ir loading of 0.25 mg/cm$^2$, and a total Pt loading of 0.25 mg/cm$^2$. A CCM was prepared using the resulting $Ir_{50}Pt_{50}$-NSTF-catalyst layers onto 50 micrometer thick, 825 equivalent weight PEM (3M Company) following the general process for preparing CCM. The full CCM was mounted into the 50 cm$^2$ electrolyzer cell and tested according to the general method for testing full CCMs, producing polarization curve 202 shown in FIG. 2.

Comparative Example C

Comparative Example C Cathode catalyst (Pt-NSTF) was prepared in the same manner as Comparative Example A. Nanostructured whiskers prepared as described above were sputter coated with pure Pt coatings in pure Ar according to the general method for preparing nanostructured thin film (Pt-NSTF) catalyst layers. The pure Pt was deposited with a loading of 0.25 mg/cm$^2$. Comparative Example C Anode catalyst ($Ir_xPt_y$-NSTF) was prepared as follows: PtIr alloy coating was sputter deposited in pure Ar onto nanostructured whiskers. The IrPt-NSTF alloy was $Ir_{55}Pt_{45}$ and was deposited to a total loading of 0.45 mg/cm². The catalyst coating contained a total Ir loading of 0.25 mg/cm², and a total Pt loading of 0.20 mg/cm². A CCM was prepared using the resulting $Ir_{55}Pt_{45}$-NSTF-catalyst layers laminated onto 50 micrometer thick, 825 equivalent weight PEM (3M Company) following the general process for preparing CCMs. The full CCM was mounted into the 50 cm² electrolyzer cell and tested according to general method for testing full CCMs, producing polarization curve 203 shown in FIG. 2.

Comparative Example D

Comparative Example D Cathode catalyst (Pt-NSTF) was prepared in the same manner as Comparative Example A. Nanostructured whiskers prepared as described above were sputter coated with pure Pt coatings in pure Ar according to the general method for preparing nanostructured thin film (Pt—NSTF) catalyst layers. The pure Pt was deposited with a loading of 0.25 mg/cm². Comparative Example D Anode catalyst ($Ir_xPt_y$-NSTF) was prepared as follows: PtIr alloy coating was sputter deposited in pure Ar onto nanostructured whiskers. The IrPt-NSTF alloy was $Ir_{62.5}Pt_{37.5}$ and was deposited to a total loading of 0.40 mg/cm². The catalyst coating contained a total Ir loading of 0.25 mg/cm², and a total Pt loading of 0.15 mg/cm². A CCM was prepared using the resulting $Ir_{62.5}Pt_{37.5}$-NSTF— catalyst layers laminated onto 50 micrometer thick, 825 equivalent weight PEM (3M Company) following the general process for preparing CCMs. The full CCM was mounted into the 50 cm² electrolyzer cell and tested according to general method for testing full CCMs, producing polarization curve 204 shown in FIG. 2.

Comparative Example E

Comparative Example E Cathode catalyst (Pt-NSTF) was prepared in the same manner as Comparative Example A. Nanostructured whiskers prepared as described above were sputter coated with pure Pt coatings in pure Ar according to the general method for preparing nanostructured thin film (Pt-NSTF) catalyst layers. The pure Pt was deposited with a loading of 0.25 mg/cm². Comparative Example E Anode catalyst ($Ir_xPt_y$-NSTF) was prepared as follows: PtIr alloy coating was sputter deposited in pure Ar onto nanostructured whiskers. The IrPt-NSTF alloy was $Ir_{71.5}Pt_{28.5}$ and was deposited to a total loading of 0.35 mg/cm². The catalyst coating contained a total Ir loading of 0.25 mg/cm², and a total Pt loading of 0.10 mg/cm². A CCM was prepared using the resulting $Ir_{71.5}Pt_{28.5}$-NSTF— catalyst layers laminated onto 50 micrometer thick, 825 equivalent weight PEM (3M Company) following the general process for preparing CCMs. The full CCM was mounted into the 50 cm² electrolyzer cell and tested according to general method for testing full CCMs, producing polarization curve 205 shown in FIG. 2.

Comparative Example F

Comparative Example F Cathode catalyst (Pt-NSTF) was prepared in the same manner as Comparative Example A. Nanostructured whiskers prepared as described above were sputter coated with pure Pt coatings in pure Ar according to the general method for preparing nanostructured thin film (Pt-NSTF) catalyst layers. The pure Pt was deposited with a loading of 0.25 mg/cm². Comparative Example F Anode catalyst ($Ir_xPt_y$-NSTF) was prepared as follows: PtIr alloy coating was sputter deposited in pure Ar onto nanostructured whiskers. The IrPt-NSTF alloy was $Ir_{83.3}Pt_{16.7}$ and was deposited to a total loading of 0.30 mg/cm². The catalyst coating contained a total Ir loading of 0.25 mg/cm², and a total Pt loading of 0.05 mg/cm². A CCM was prepared using the resulting $Ir_{83.3}Pt_{16.7}$-NSTF— catalyst layers laminated onto 50 micrometer thick, 825 equivalent weight PEM (3M Company) following the general process for preparing CCMs. The full CCM was mounted into the 50 cm² electrolyzer cell and tested according to general method for testing full CCMs, producing polarization curve 206 shown in FIG. 2.

Example 1

The Example 1 Cathode catalyst (Pt-NSTF) was prepared in the same manner as Comparative Example A. Nanostructured whiskers prepared as described above were sputter coated with pure Pt coatings in pure Ar according to the general method for preparing nanostructured thin film (Pt-NSTF) catalyst layers. The pure Pt was deposited with a loading of 0.25 mg/cm². The Example 1 Anode catalyst was prepared in the following manner: pure Ir coating was sputter deposited in pure Ar onto nanostructured whiskers. The pure Ir was deposited with a loading of 0.25 mg/cm². Full CCMs were prepared with the resulting Ir-NSTF catalysts layers using 50 micrometer thick, 825 equivalent weight PEM (3M Company) by the hot-roll lamination process described above. The full CCM was mounted into the 50 cm² electrolyzer cell and tested according to the general method for testing full CCMs, producing polarization curve 207 shown in FIG. 2.

Example 2

A full CCM was prepared as described for Example 1 (and Comparative Example A), except that the anode catalyst was prepared using NSTF-Ir with an Ir loading of 0.032 mg/cm² on nanostructured whiskers on 50 micrometer thick, 825 equivalent weight PEM (3M Company). The cathode catalyst was again Pt-NSTF, using pure Pt deposited with a loading of 0.25 mg/cm², as in Example 1. The complete CCM was then tested following the general method for testing full CCMs described above. Tests were performed using 50 cm² cells heated to 80° C. with water flowing at 75 ml/min. Once at temperature, a potentiodynamic scan from 1.35 V to 2.0 V with 50 mV steps and 300 seconds per step was run. This was followed by 1 hour of 100 Amp galvanostatic testing. The cycle was then repeated with the 11th potentiodynamic scan being used to extract data for 1.75 V and 1.85 V cell polarizations, which are shown in Table 1, below.

TABLE 1

| Example # | Iridium Loading, mg Ir/cm² | Current Density at 1.75 V, A/cm² | Current Density at 1.85 V, A/cm² |
|---|---|---|---|
| 2 | 0.032 | 0.186 | 0.32 |
| 3 | 0.065 | 0.203 | 0.38 |
| 4 | 0.125 | 2.337 | 4.147 |
| 5 | 0.25 | 3.054 | 5.292 |
| 6 | 0.375 | 3.148 | 5.338 |
| 7 | 0.5 | 3.333 | 5.58 |
| 8 | 1.0 | 3.392 | 5.661 |

Example 3

A full CCM was prepared as described for Example 1, except that the anode catalyst was NSTF-Ir with an Ir loading of 0.065 mg/cm$^2$ on nanostructured whiskers on 50 micrometer 825 equivalent weight PEM (3M Company). The complete CCM was then tested following the procedure in Example 2. Measured values for 1.75 V and 1.85 V cell polarizations are shown in Table 1, above.

Example 4

A full CCM was prepared as described for Example 1, except that the anode catalyst was NSTF-Ir with an Ir loading of 0.125 mg/cm$^2$ on nanostructured whiskers on 50 micrometer 825 equivalent weight PEM (3M Company). The complete CCM was then tested following the procedure in Example 2. Measured values for 1.75 V and 1.85 V cell polarizations are shown in Table 1, above.

Example 5

A full CCM was prepared as described for Example 1, except that the anode catalyst was NSTF-Ir with an Ir loading of 0.250 mg/cm$^2$ on nanostructured whiskers on 50 micrometer 825 equivalent weight PEM (3M Company). The complete CCM was then tested following the procedure in Example 2. Measured values for 1.75 V and 1.85 V cell polarizations are shown in Table 1, above.

Example 6

A full CCM was prepared as described for Example 1, except that the anode catalyst was NSTF-Ir with an Ir loading of 0.375 mg/cm$^2$ on nanostructured whiskers on 50 micrometer 825 equivalent weight PEM (3M Company). The complete CCM was then tested following the procedure in Example 2. Measured values for 1.75 V and 1.85 V cell polarizations are shown in Table 1, above.

Example 7

A full CCM was prepared as described for Example 1, except that the anode catalyst was NSTF-Ir with an Ir loading of 0.500 mg/cm$^2$ on nanostructured whiskers on 50 micrometer 825 equivalent weight PEM (3M Company). The complete CCM was then tested following the procedure in Example 2. Measured values for 1.75 V and 1.85 V cell polarizations are shown in Table 1, above.

Example 8

A full CCM was prepared as described for Example 1, except that the anode catalyst was NSTF-Ir with an Ir loading of 1.000 mg/cm$^2$ on nanostructured whiskers on 50 micrometer 825 equivalent weight PEM (3M Company). The complete CCM was then tested following the procedure in Example 2. Measured values for 1.75 V and 1.85 V cell polarizations are shown in Table 1, above.

Example 9

High current density operation is demonstrated in this example. An Ir-NSTF oxygen evolution electrocatalyst was further stabilized with the addition of less than a monolayer of Au to the final Ir/Ir Oxide layer, according to the following coating procedure: Au was coated on an existing 0.25 mg/cm$^2$ Ir loading Ir-NSTF catalyst using an e-beam coater (obtained under the trade designation "MARK 50" from CHA Industries, Fremont, Calif.). Three planetary rotators mounted with the Ir-NSTF target substrate were rotated inside the system under vacuum, with the 270 degree electron beam heating the Au to its sublimation point. Once the source (Au) sublimated, the deposition monitor (obtained under the trade designation "INFICON IC 6000" from Inficon, Bad Ragaz, Switzerland) gave a real time angstrom deposition amount and angstrom deposition rate. The operator monitored the deposition rate while controlling power to achieve a uniform coating. Gold was applied to the three samples at planar equivalent thicknesses of 100-120 angstroms, 200-203 angstroms, and 300-301 angstroms, respectively, at a deposition rate of 3-5 angstroms/second. Once the deposition amount was attained, the power to the electron beam was terminated and the deposition ended. The system was then vented and the Au-stabilized Ir-NSTF substrates were removed from the vacuum chamber. Only a single deposition of Au was applied onto Ir-NSTF in this manner. The sample having a planar equivalent thickness of 100-120 angstroms was used in this example.

A membrane electrode assembly was constructed according to the general method for preparing CCMs above, using the Au-stabilized Ir-NSTF anode catalyst and a 50 micrometer thick, 825 equivalent weight perfluorosulfonic acid membrane (3M Company). The cathode catalyst laminated to the other side of the membrane was pure platinum deposited on NSTF whiskers at a loading of 25 mg/cm$^2$. The MEA was mounted in a 25 cm$^2$ cell (obtained under the trade designation "25 SCH" from Fuel Cell Technologies, Inc., Albuquerque, N. Mex.) that had been fitted with an anode-side Ti fluid distribution layer (obtained from Proton OnSite, Inc., Wallingford, Conn.). The cell was heated to 80° C. with water flowing to the anode at 75 ml/min. Once at temperature, a potentiodynamic scan from 1.35 V to 2.9 V with 50 mV steps and 5 seconds per step was performed. This was followed by 0.5 hour of potentiostatic polarization at 2.0 V/cell followed by re-running the potentiodynamic scan. The cycle was then repeated until the end of experiment (typically 100 hours or less). In this instance, only the initial results were reported, as the cell was then subjected to a durability test at a constant potential of 2.2 V with scan depth reduced also to 2.2 V to limit the maximum currents pulled. At a cell voltage of 1.713 V, the current density was approximately 2.716 A/cm$^2$ (upscan). From there, the current density rose approximately linearly with cell voltage, reaching approximately 19 A/cm$^2$ at a cell voltage of 2.85 V. The power density of the cell was approximately linear with current density, reaching a value of about 54 W/cm$^2$ at the current density of 19 A/cm$^2$.

Example 10

This example provides data on the durability of the Ir-NSTF oxygen evolution reaction catalyst. A membrane electrode assembly was constructed according to the general method for preparing CCMs above, using a pure Ir-NSTF oxygen evolution catalyst at 0.25 mg/cm$^2$ loading as the anode catalyst, a perfluorosulfonic acid as the ion conducting membrane (obtained under the trade designation "NAFION 117" from DuPont Chemicals, Wilmington, Del.), and a pure Pt-NSTF cathode catalyst at 0.25 mg/cm$^2$ loading.

Durability Experimental Conditions

The above membrane electrode assembly was mounted in a 50 cm$^2$ cell (obtained under the trade designation "50SCH"

Fuel Cell Technologies, Inc.), that was fitted with an anodic Ti fluid distribution layer (obtained from Giner, Inc., Auburndale, Mass.). The cell was operated at ambient pressure, and was heated to 80° C. with water flowing to the anode at 75 ml/min. Once at temperature, a galvanodynamic scan from zero to 100 Amps at 10 Amps/min scan rate was run. That was followed by electrochemical impedance spectroscopy (EIS) in a galvano-controlled mode from 10,000 Hz to 0.1 Hz with 20 points per decade with an applied 5 Amps current bias and an amplitude of 500 mA. This was followed by a 24 hour galvanostatic hold at 100 Amps. The cycle was then repeated starting with the galvanodynamic scan. Currents at the end of the 24 hour run were reported and plotted on a durability graph. After 4000 hours of testing at a current density of 2 A/cm$^2$, the overall degradation rate recorded for Ir-NSTF was found to be −5.5 μV/h. The test was still continuing in late May 2015, passing 5000 hours.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. An electrode membrane assembly having an oxygen evolution reaction electrode, the electrode membrane assembly comprising, in order:
    an ion conducting membrane having first and second generally opposed major surfaces;
    nanostructured whiskers with an oxygen evolution reaction electrocatalyst thereon, the electrocatalyst comprising two or more consecutive layers, wherein each layer of the two or more consecutive layers comprises at least 95 atomic percent Ir, and not greater than 5 atomic percent Pt, based on the total collective cation and elemental metal content of the respective layer; and
    a first fluid transport layer comprising an electrically conductive, corrosion resistant, porous metal,
    wherein the nanostructured whiskers are adjacent to the first major surface of the ion conducting membrane,
    wherein the ion conducting membrane, the nanostructured whiskers having the oxygen evolution reaction electrocatalyst thereon, and the first fluid transport layer collectively have an electrical conductance of at least 0.1 S·cm$^{-2}$.

2. The electrode membrane assembly of claim 1, wherein the Ir is present at least in part as Ir oxide.

3. The electrode membrane assembly of claim 1, wherein the oxygen evolution reaction catalyst comprises not greater than 0.001 atomic percent Pt, based on the total collective cation and elemental metal content of the respective layer.

4. The electrode membrane assembly of claim 1, wherein the first fluid transport layer comprises Ti.

5. The electrode membrane assembly of claim 1, wherein the ion conducting membrane comprises a proton exchange membrane.

6. The electrode membrane assembly of claim 1, wherein the nanostructured whiskers are at least partially embedded in the ion conducting membrane.

7. The electrode membrane assembly of claim 1, wherein the oxygen evolution reaction electrocatalyst is a continuous layer on the nanostructured whiskers.

8. The electrode membrane assembly of claim 1, wherein the ion conducting membrane has an equivalent weight less than or equal to 1200 equivalents per gram.

9. The electrode membrane assembly of claim 1, wherein the ion conducting membrane has a thickness less than or equal to 50 micrometers.

10. The electrode membrane assembly of claim 1, wherein the ion conducting membrane comprises a highly fluorinated polymer electrolyte.

11. The electrode membrane assembly of claim 1, wherein the Ir loading in the oxygen evolution reaction electrocatalyst is 0.25 mg/cm$^2$, and the oxygen evolution reaction electrocatalyst further comprises a surface coating of Au that is less than a monolayer thick.

12. The electrode membrane assembly of claim 1, wherein the Ir loading in the oxygen evolution reaction electrocatalyst is at least 0.125 mg/cm$^2$.

13. An electrochemical device comprising electrode membrane assembly claim 1.

14. The electrochemical device of claim 13, further comprising a hydrogen evolution reaction catalyst adjacent the second major surface of the ion conducting membrane and an electrically conducting second fluid transport layer in electrical contact with the hydrogen evolution reaction catalyst.

15. The electrochemical device of claim 14, wherein the hydrogen evolution reaction catalyst comprises nanostructured whiskers having a major surface with a hydrogen evolution reaction electrocatalyst comprising Pt thereon.

16. The electrode membrane assembly of claim 15, wherein the highly fluorinated polymer electrolyte is a perfluorosulfonic acid.

17. The electrochemical device of claim 13, wherein the device is a water electrolyzer.

18. The electrochemical device of claim 13, wherein the device is a $CO_2$ electrolyzer.

19. A method of generating hydrogen and oxygen from water, the method comprising:
    providing an electrode membrane assembly of claim 1, the electrode membrane assembly comprising an anode and a cathode catalyst, the anode being the oxygen evolution reaction electrode, and the cathode catalyst being adjacent to the second major surface of the ion conducting membrane;
    providing water in contact with the anode; and
    providing an electrical potential with sufficient current across the membrane electrode assembly to convert at least a portion of the water to hydrogen and oxygen on the cathode and anode, respectively.

* * * * *